(12) United States Patent
Zara

(10) Patent No.: US 12,455,874 B2
(45) Date of Patent: Oct. 28, 2025

(54) SYSTEMS AND METHODS FOR DYNAMIC MEDIA ASSET MODIFICATION

(71) Applicant: Better Cheaper Now LTD, Columbus, OH (US)

(72) Inventor: Anthony Zara, Columbus, OH (US)

(73) Assignee: Better Cheaper Now LTD, Columbus, OH (US)

(*) Notice: Subject to any disclaimer, the term of this patent is extended or adjusted under 35 U.S.C. 154(b) by 0 days.

(21) Appl. No.: 18/433,060

(22) Filed: Feb. 5, 2024

(65) Prior Publication Data

US 2024/0320210 A1    Sep. 26, 2024

Related U.S. Application Data

(63) Continuation of application No. 17/687,578, filed on Mar. 4, 2022, now Pat. No. 11,899,656.

(51) Int. Cl.
| | | |
|---|---|---|
| G06F 16/23 | (2019.01) | |
| G06F 16/25 | (2019.01) | |
| G06F 16/48 | (2019.01) | |
| G06F 40/143 | (2020.01) | |
| G06T 11/00 | (2006.01) | |

(52) U.S. Cl.
CPC ........ *G06F 16/2379* (2019.01); *G06F 16/258* (2019.01); *G06F 16/48* (2019.01); *G06F 40/143* (2020.01); *G06T 11/00* (2013.01)

(58) Field of Classification Search
CPC .... G06F 16/2379; G06F 16/258; G06F 16/48; G06F 40/143; G06T 11/00; G06T 2200/24; G06T 11/60
See application file for complete search history.

(56) References Cited

U.S. PATENT DOCUMENTS

| | | | |
|---|---|---|---|
| 8,949,250 B1 | 2/2015 | Garg et al. | |
| 2008/0178198 A1* | 7/2008 | Gauba | G06F 16/48 |
| | | | 719/320 |
| 2010/0318600 A1* | 12/2010 | Furbeck | H04L 65/612 |
| | | | 709/203 |
| 2012/0072542 A1* | 3/2012 | McGowan | H04L 67/06 |
| | | | 709/219 |
| 2014/0129563 A1 | 5/2014 | Scott et al. | |
| 2015/0019480 A1* | 1/2015 | Maquaire | G06F 16/2365 |
| | | | 707/609 |
| 2016/0353169 A1 | 12/2016 | Miller et al. | |

(Continued)

*Primary Examiner* — Quoc A Tran
(74) *Attorney, Agent, or Firm* — Pierson Ferdinand LLP; Daniel Rose

(57) ABSTRACT

The present disclosure provides systems and methods for transforming media assets using data retrieved from external sources. A system can identify a request to update one or more media assets maintained in a database of a media asset system. The system can retrieve, from a remote data system identified in the request, data corresponding to object metadata of each media asset of the one or more media assets. The system can generate, for each media asset of the one or more media assets, an updated media asset to include the data retrieved from the remote data system. The system can modify the object metadata of each of the one or more media assets based on the data. The system can update, responsive to the request, the database with each updated media asset. The updated media assets can be transmitted to client devices for display in information resources.

20 Claims, 7 Drawing Sheets

(56) References Cited

U.S. PATENT DOCUMENTS

| | | |
|---|---|---|
| 2016/0357409 A1 | 12/2016 | Gil |
| 2017/0045364 A1 | 2/2017 | Trivedi |
| 2018/0067946 A1 | 3/2018 | Vaisler et al. |
| 2018/0343476 A1 | 11/2018 | Loheide et al. |
| 2020/0107054 A1 | 4/2020 | Srinivasan et al. |
| 2023/0251997 A1* | 8/2023 | Wang .................. H04L 67/1095 707/646 |

* cited by examiner

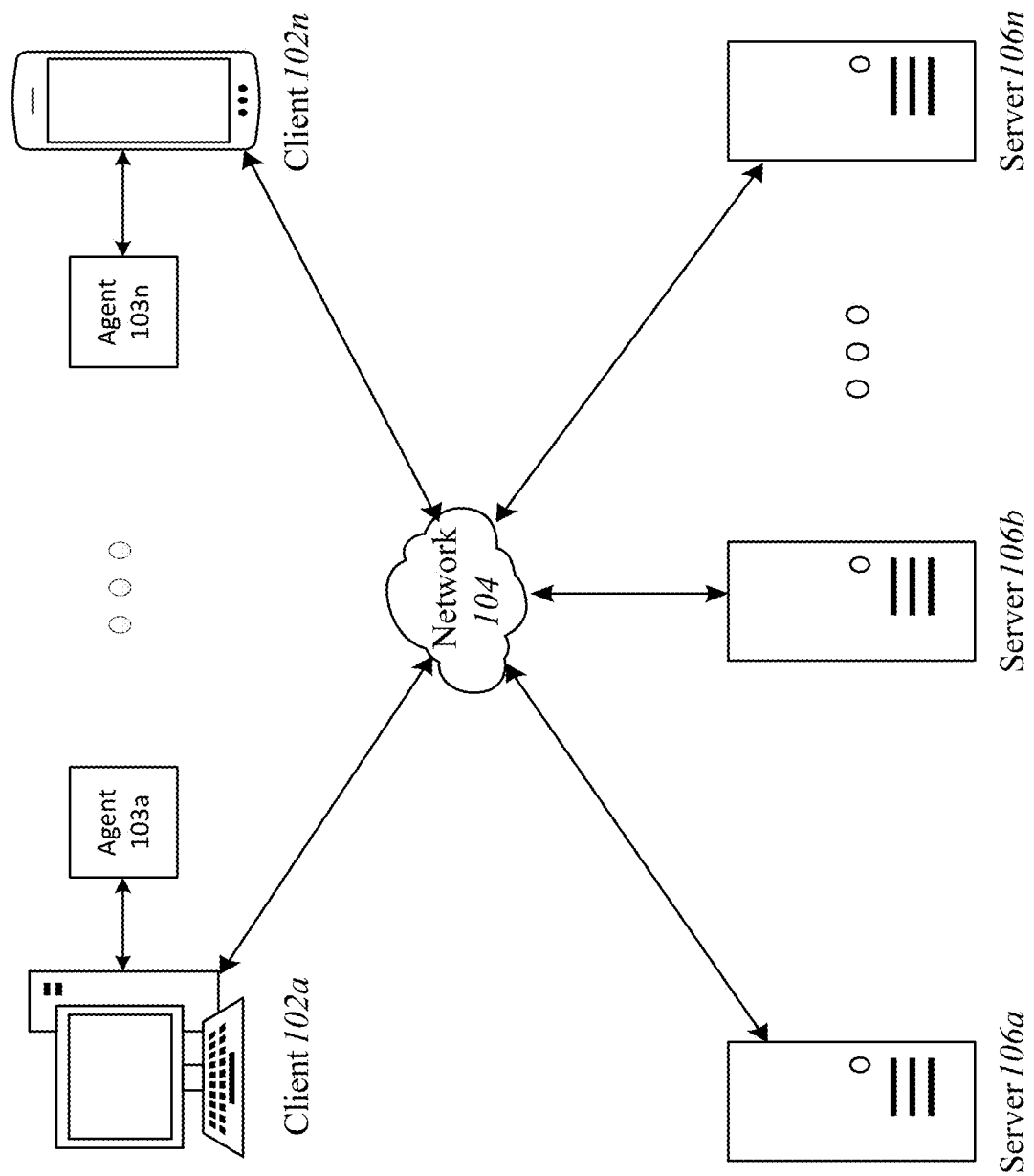

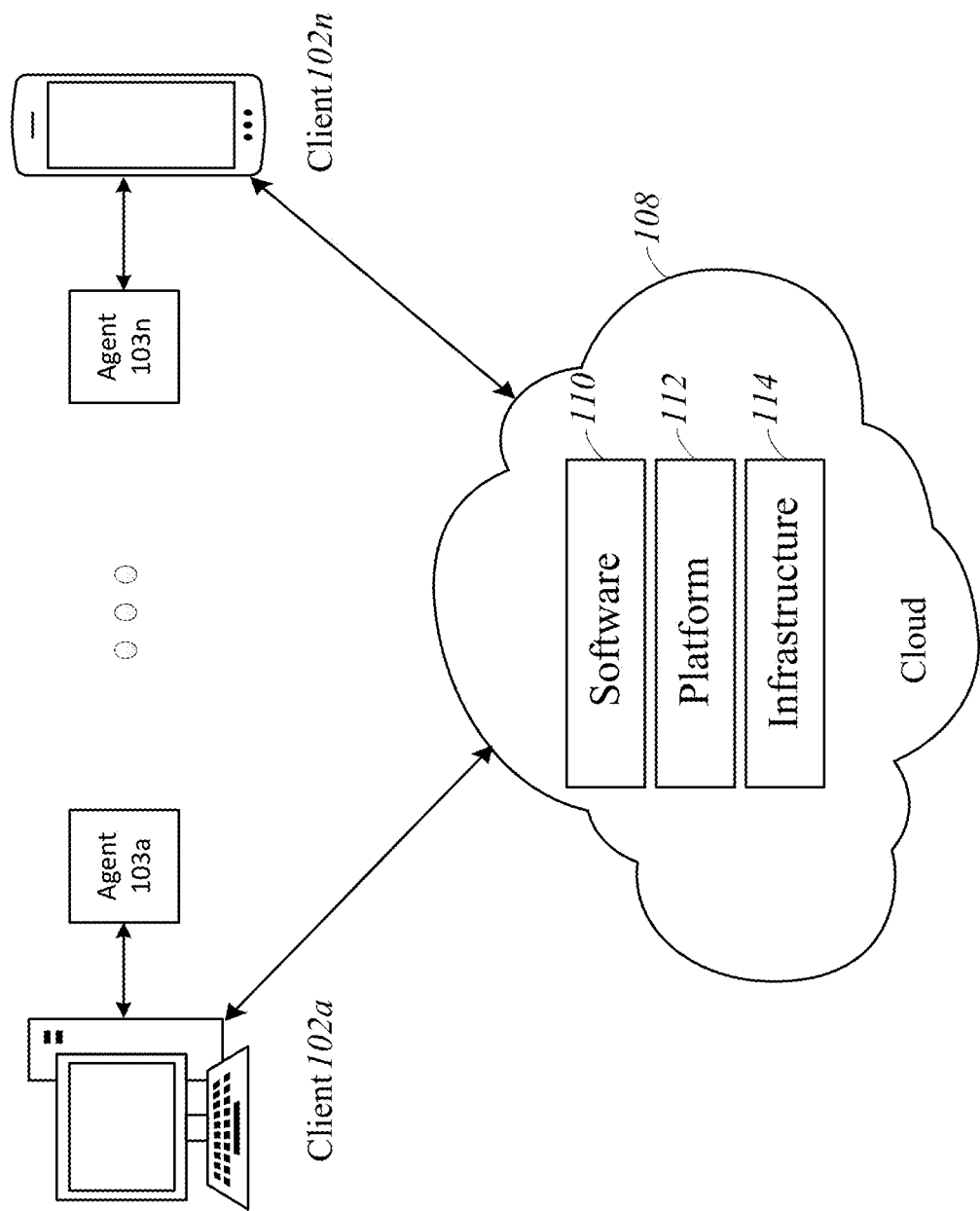

SYSTEMS AND METHODS FOR DYNAMIC MEDIA ASSET MODIFICATION

RELATED APPLICATIONS

This application claims the benefit of and priority as a continuation to U.S. Nonprovisional patent application Ser. No. 17/687,578, entitled "Systems and Methods for Dynamic Media Asset Modification," filed Mar. 4, 2022, the entirety of which is incorporated herein by reference.

BACKGROUND

In a computer networked environment such as the internet, media asset publishers provide media assets for display on end-user computing devices. These media assets can be displayed on a web page associated with a respective publisher. Modifying large catalogs of content to conform to a target context is particularly challenging.

SUMMARY

Traditional content publishing systems provide content to client devices in various presentation or serving contexts, for example, in response to requests. Often, the requested content is displayed as part of a webpage, email, or another type of information resource. In many circumstances, content publishers display requested content on information resources hosted on a publisher platform. The requested content can be one of many media assets that are stored as part of a media catalog. Traditionally, the presentation of a media asset in an information resource is performed without any modification of the media asset beyond basic formatting (e.g., minor scaling, etc.). However, many publishers prefer to modify content to conform to a context provided by the information resource on which the media assets will be presented. But, because the catalogs of content are so large, this task is often impracticable to perform for many publishers.

The systems and methods of this technical solution solve these and other issues by providing techniques for combining data from multiple sources to transform content for presentation on an information resource. The system can monitor the catalog of media assets maintained in a media asset catalog at media source. Upon detecting a change to the media assets, the systems and methods described herein can retrieve existing media assets from a catalog hosted by a source, which may not support content transformation directly, and transform the content using data retrieved from external sources. Transforming the content can be performed by overlaying the data retrieved from the external content source and modifying the content to conform to the target serving context of the information resource.

At least one aspect of the present disclosure is directed to a method. The method can be performed, for example, by one or more processors coupled to memory. The method can include identifying a request to update one or more media assets maintained in a database of a media asset system. The method can include retrieving, from a remote data system identified in the request, data corresponding to object metadata of each media asset of the one or more media assets. The method can include generating, for each media asset of the one or more media assets, an updated media asset to include the data retrieved from the remote data system. The method can include modifying the object metadata of each of the one or more media assets based on the data. The method can include updating, responsive to the request, the database with each updated media asset.

In some implementations, generating the updated media asset for each media asset of the one or more media assets can include generating overlay content including at least a portion of the data. In some implementations, generating the updated media asset for each media asset of the one or more media assets can include combining the overlay content and the media asset to generate the updated media asset. In some implementations, at least one media asset of the one or more media assets is an image. In some implementations, combining the overlay content and the at least one media asset can include overlaying the image of the at least one media asset with the overlay content to generate the updated media asset.

In some implementations, updating the database can include formatting the object metadata of the one or more media assets to conform to formatting requirements of the media asset system. In some implementations, the method can include retrieving, from the database of the media asset system, the one or more media assets and the object metadata of each of the one or more media assets. In some implementations, retrieving the one or more media assets maintained in the database of the media asset system can include retrieving a media catalog from the database maintained by the media asset system. In some implementations, retrieving the one or more media assets maintained in the database of the media asset system can include extracting, from the media catalog, the one or more media assets and the object metadata of each media asset of the one or more media assets.

In some implementations, identifying the request to update the one or more media assets can include detecting an update to the database of the media asset system. In some implementations, updating the database with each updated media asset is responsive to detecting the update. In some implementations, identifying the request to update the one or more media assets can include receiving, from the remote data system, an indication that the data has changed. In some implementations, updating the database with each updated media asset is responsive to receiving the indication that the data has changed. In some implementations, the object metadata of each media asset of the one or more media assets can include a description of the media asset. In some implementations, modifying the object metadata can include modifying the description to include at least a portion of the data. In some implementations, the method can include generating the one or more media assets and the object metadata of each of the one or more media assets by scraping the database of the media asset system or a web page provided by a remote computing device.

At least one other aspect of the present disclosure is directed to a system. The system can include one or more processors coupled to memory. The system can identify a request to update one or more media assets maintained in a database of a media asset system. The system can retrieve, from a remote data system identified in the request, data corresponding to object metadata of each media asset of the one or more media assets. The system can generate, for each media asset of the one or more media assets, an updated media asset to include the data retrieved from the remote data system. The system can modify the object metadata of each of the one or more media assets based on the data. The system can update, responsive to the request, the database with each updated media asset.

In some implementations, the system can generate the updated media asset for each media asset of the one or more media assets by performing operations comprising generating overlay content including at least a portion of the data. In some implementations, the system can generate the updated media asset for each media asset of the one or more media assets by performing operations comprising combining the overlay content and the media asset to generate the updated media asset. In some implementations, at least one media asset of the one or more media assets is an image. In implementations, the system can combine the overlay content and the at least one media asset by overlaying the image of the at least one media asset with the overlay content to generate the updated media asset.

In some implementations, the system can update the database further by performing operations comprising formatting the object metadata of the one or more media assets to conform to formatting requirements of the media asset system. In some implementations, the system can retrieve, from the database of the media asset system, the one or more media assets and the object metadata of each of the one or more media assets. In some implementations, the system can retrieve the one or more media assets maintained in the database of the media asset system by performing operations comprising retrieving a media catalog from the database maintained by the media asset system. In some implementations, the system can retrieve the one or more media assets maintained in the database of the media asset system by performing operations comprising extracting, from the media catalog, the one or more media assets and the object metadata of each media asset of the one or more media assets.

In some implementations, the system can identify the request to update the one or more media assets by performing operations comprising detecting an update to the database of the media asset system. In some implementations, the system can update the database with each updated media asset responsive to detecting the update. In some implementations, the system can identify the request to update the one or more media assets by performing operations comprising receiving, from the remote data system, an indication that the data has changed. In some implementations, the system can update the database with each updated media asset responsive to receiving the indication that the data has changed. In some implementations, the object metadata of each media asset of the one or more media assets comprises a description of the media asset. In some implementations, the system can modify the object metadata by modifying the description to include at least a portion of the data. In some implementations, the system can generate the one or more media assets and the object metadata of each of the one or more media assets by scraping the database of the media asset system or a web page provided by a remote computing device.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form. For example, aspects can be implemented by appropriate computer programs, which may be carried on appropriate carrier media (computer readable media), which may be tangible carrier media (e.g., disks) or intangible carrier media (e.g., communications signals). Aspects may also be implemented using suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1A is a block diagram depicting an embodiment of a network environment comprising a client device in communication with a server device;

FIG. 1B is a block diagram depicting a cloud computing environment comprising a client device in communication with cloud service providers;

DETAILED DESCRIPTION

Figure 1C:
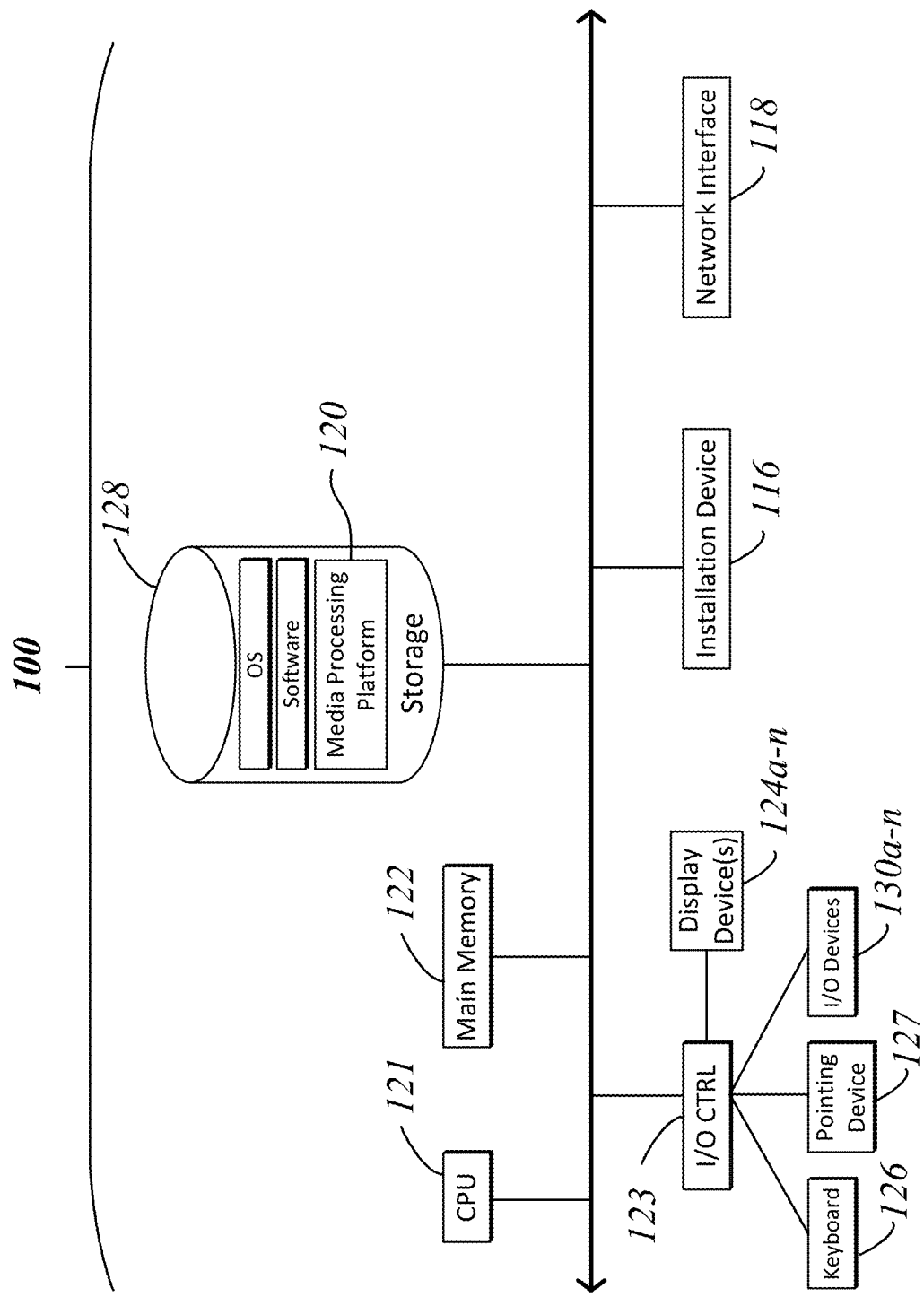
FIGS. 1C and 1D are block diagrams depicting embodiments of computing devices useful in connection with the methods and systems described herein.

Below are detailed descriptions of various concepts related to, and implementations of, techniques, approaches, methods, apparatuses, and systems for transforming content using data retrieved from external sources. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes systems and methods for transforming content using data retrieved from external sources.

A. Computing and Network Environment

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s)

102, client device(s) 102, endpoint(s) 102, or endpoint node(s) 102) in communication with one or more agents 103a-103n and one or more servers 106a-106n (also generally referred to as server(s) 106, node(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, and Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely, and the network 104 can be a body area network (BAN), a personal area network (PAN), a local-area network (LAN), e.g., Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous-one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud-based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1D:
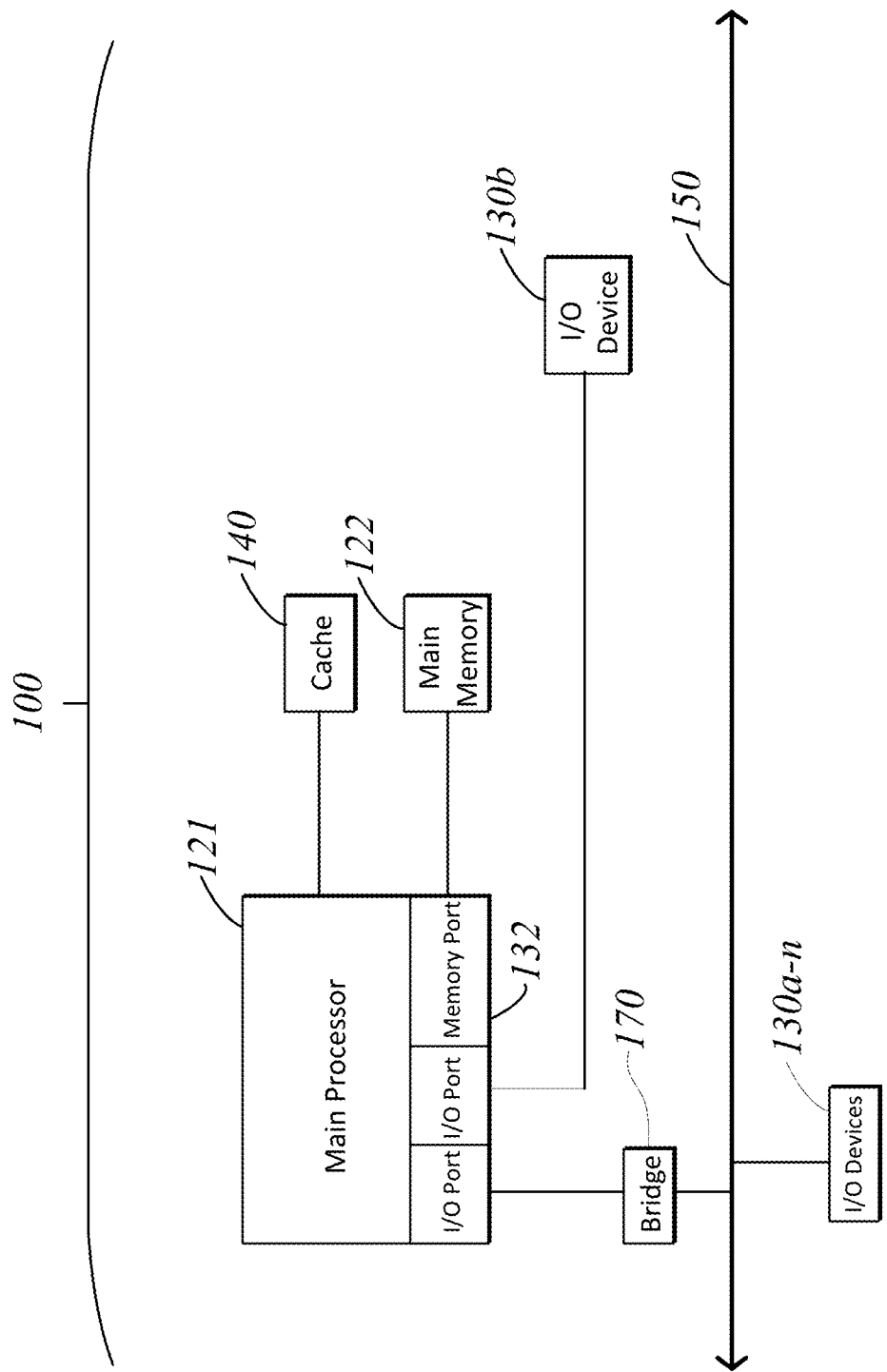

The client 102 and server 106 may be deployed as and/or executed on any type and form of computing device, e.g., a computer, network device, or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g., a mouse. The storage device 128 may include, without limitation, an operating system, software, and media processing platform 120, which can implement any of the features of the media processing system 205 described herein below in conjunction with FIG. 2. As shown in FIG. 1D, each computing device 100 may also include additional optional elements, e.g., a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile, e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed; the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n, or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexible displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic techniques. Display devices 124a-124n may also include a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable, or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the media processing platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage devices 128 may be non-volatile, mutable, or read-only. Some storage devices 128 may be internal and connect to the computing device 100 via a bus 150. Some storage devices 128 may be external and connect to the computing device 100 via an I/O device 130 that provides an external bus. Some storage devices 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage devices 128 may also be used as an installation device 116, and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase, and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing the computing device 100 to any type of network capable of communication and performing the operations described herein.

A computing device 100 of the sort depicted in FIGS. 1C and 1D may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; Linux, a freely-available operating system, e.g., Linux Mint distribution ("distro") or Ubuntu, distributed by Canonical Ltd. of London, United Kingdom; Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications, or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; the Samsung GALAXY family of smartphones manufactured by Samsung, Inc.; or the Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Transforming Content Using Data Retrieved from External Sources

Publishers, such as the provider of a website of email service, present content from a content source as a part of information resources provided to client devices. Information resources can include, for example, web pages, articles, email messages, or other types of electronic transmissions that can include media assets. Although publishers can provide some selection criteria that control which media assets are presented on the information resources the publishers provide, the publishers often do not have the resources or ability to directly modify media assets using automatic processes.

In many cases, a publisher may maintain a catalog of media assets using a media asset server, which is periodically updated when a publisher, or another content source, modifies the catalog. Although some publishers may use rudimentary automatic formatting techniques (e.g., basic scaling, etc.), publishers typically cannot modify content automatically for every item of content in the content catalog to conform to targets serving contexts. For example, it is challenging for publishers to automatically modify and format catalogs of media assets for particular network bandwidth requirements. In addition, if a publisher's serving context indicates that additional information should be provided in connection with a particular media asset, an additional request must be made by the publisher's information resource each time the particular media asset is served. Making such requests can exhaust network bandwidth and network computing resources when the requests occur across large numbers of client devices.

The systems and methods of this technical solution solve these and other issues by providing techniques for accessing, transforming, and updating catalogs of media assets in accordance with various serving contexts. In doing so, the systems and methods described herein can generate transformed media assets that include additional information from external sources for target serving contexts. Because each media asset is transformed to include the additional information, a client device is no longer required to make a separate request for the additional information at the external source, which greatly reduces the utilization of network computing resources. In addition, the systems and methods described herein can transform catalogs of media assets in accordance with various bandwidth requirements, further reducing the overall network resource utilization when providing the media assets to many client devices.

The systems and methods described herein can retrieve a catalog of media assets from a media asset server that is associated with a content publisher. The catalog can be generated, for example, as an extensible markup language (XML) or comma-separated values (CSV) file that includes information about each media asset in the catalog. In some implementations, the catalog can be formatted as a spreadsheet, or generated via a web scraping process to gather the appropriate media asset information. The systems and methods described herein can execute application programming interface (API) calls to the media asset server to retrieve the catalog for modification.

Then, using additional API calls to a remote computing device or remote database, the systems and methods described herein can retrieve additional metadata or other information associated with each media asset identified in the catalog data. The API calls can be used, for example, to perform a key-value lookup procedure at the database or remote computing device. Any type of data related to the media asset can be retrieved, including a description of the media asset, a title of the media asset, payment information associated with the media asset (e.g., payment installment information, interest rate information, price information, etc.), category information related to the media asset, user-specific information that corresponds to the media asset (e.g., information from one or more user profiles used to access the respective publisher, etc.), or any other media asset data or metadata. In some implementations, the data can include predetermined text strings used in target serving contexts that are related to the publisher or the media asset.

The data retrieved using the API calls can be combined with the media assets in the catalog to generate transformed media assets. Any aspect of the media asset can be transformed or modified in accordance with the retrieved data and one or more formatting rules, including, for example, text, images, audio, or video, among others. In addition, metadata associated with the media asset, such as descriptive data, can be modified in addition to the media content, including titles, descriptions, tags, labels, or categories, among others. Visual portions of the media assets can be transformed by the systems and methods described herein, for example, by generating overlays containing portions of the retrieved additional data. These overlays can be combined with the original media asset to generate an updated media asset including both the overlay and the original media asset.

This process can be repeated for each media asset in the catalog, or each media asset that is requested to be updated (e.g., by a publisher device, etc.) The transformed set of media items can then be formatted into the required formats of the content server from which the media assets were retrieved. For example, the systems and methods described herein can update the transformed catalog of media assets to be in an XML or CSV format. The systems and methods can synchronize updates to the transformed media content, such that an update by the a publisher or another computing device to the media asset catalog, or an update by the remote computing system to the additional data, can trigger the systems and methods described herein to update the transformed media assets using the new data.

The catalog of media content can be generated using various different processes. For example, in some implementations, the catalog of media assets can be provided by a media asset server as a file or series of files. In some implementations, the catalog of media assets can be generated using one or more API calls to the media asset server. The one or more API calls are used to perform the function of reading or writing to the media asset server attributes, and formatting those attributes into the catalog of media assets required by the publisher. In some implementations, the catalog of media assets can be retrieved directly from an external data platform, for example, if the external media platform has a connection (e.g., an API call or other access procedure, etc.) to the media asset server.

Thus, the systems and methods described herein can automatically detect changes to, and transform, catalogs of media assets for presentation by publisher devices. The techniques described herein can allow the media assets to be transformed to include additional data for target serving contexts, which removes the requirement for additional requests to be transmitted by client devices, thereby improving overall network performance. Accordingly, the systems and methods described herein provide a technical improvement to content publishing systems by quantity of network requests when providing media assets to many client devices. An example system that implements these and other techniques is described in connection with FIG. 2.

Figure 2:
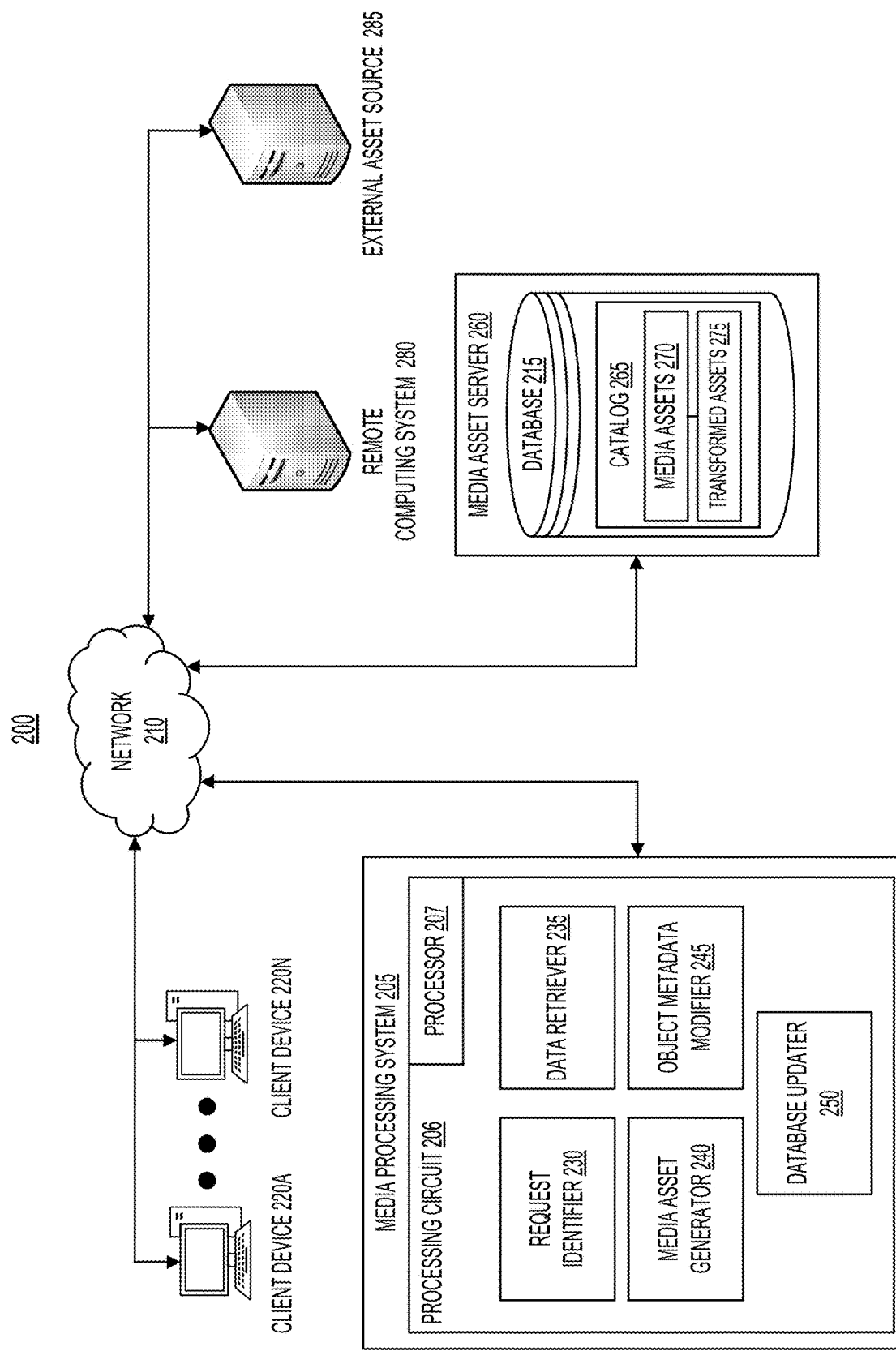
FIG. 2 is a block diagram of an example system for transforming content using data retrieved from external sources, in accordance with one or more implementations.

Referring now to FIG. 2, illustrated is a block diagram of an example system 200 for transforming content using data retrieved from external sources, in accordance with one or more implementations. The system 200 can include at least one media processing system 205, at least one network 210, one or more client devices 220A-220N (sometimes generally referred to as client device(s) 220), at least one media asset server 260, at least one remote computing system 280, and at least one external asset source 285. The media processing system 205 can include at least one processing circuit 206, which can include at least one processor 207, at least one request identifier 230, at least one data retriever 235, a least one media asset generator 240, at least one object metadata modifier 245, and at least one database updater 250. The media asset server can include at least one database 215, which can maintain a catalog 265 storing one or more media asset(s) 270 and one or more transformed asset(s) 275. In some implementations, the database 215 can be external to the media asset server 260, for example, as a part of a cloud computing system or an external computing device in communication with the devices (e.g., the media processing system 205, the client devices 220, the media asset server 260, etc.) of the system 200 via the network 210.

Each of the components (e.g., the media processing system 205, the network 210, the client devices 220, the media asset server 260, the remote computing system 280, the external asset source 285, the request identifier 230, the data retriever 235, a least one media asset generator 240, the object metadata modifier 245, the database updater 250, the database 215, etc.) of the system 200 can be implemented using the hardware components or a combination of software with the hardware components of a computing system, such as the computing system 100 detailed herein in conjunction with FIGS. 1A-1D, or any other computing system described herein. Each of the components of the media processing system 205 can perform any of the functionalities detailed herein.

The media processing system 205 can include at least one processor 207 and a memory, (e.g., a processing circuit 206). The memory can store processor-executable instructions that, when executed by processor, cause the processor to perform one or more of the operations described herein. The processor 207 may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The media processing system 205 can include one or more computing devices or servers that can perform various functions as described herein. The media processing system 205 can include any or all of the components and perform any or all of the functions of the computer system 100 described herein in conjunction with FIGS. 1A-1D.

The network 210 can include computer networks such as the Internet, local, wide, metro or other area networks, intranets, satellite networks, other computer networks such as voice or data mobile phone communication networks, or any combinations thereof. The media processing system 205 of the system 200 can communicate via the network 210, for example, with one or more client devices 220, the media asset server 260, the remote computing system 280, or the external asset source 285. The network 210 may be any form of computer network that can relay information between the media processing system 205, the one or more client devices 220, the media asset server 260, the remote computing system 280, the external asset source 285, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the media processing system 205, the one or more client devices 220, the media asset server 260, the remote computing system 280, the external asset source 285, etc.) may communicate wirelessly (e.g., via Wi-Fi, cellular, radio, etc.) with a transceiver that is hardwired (e.g., via a fiber optic cable, a CAT5 cable, etc.) to other computing devices in the network 210. Any or all of the computing devices described herein (e.g., the media processing system 205, the one or more client devices 220, the media asset server 260, the remote computing system 280, the external asset source 285, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B.

Each of the client devices 220 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 220 can include one or more computing devices or servers that can perform various functions as described herein. The one or more client devices 220 can include any or all of the components and perform any or all of the functions of the computer system 100 described herein in conjunction with FIGS. 1A-1D. The client devices 220 can be, or can be similar to, the client devices 102 described herein above in conjunction with FIGS. 1A-1D.

Each client device 220 can include, but is not limited to, a television device, a mobile device, smart phone, personal computer, a laptop, a gaming device, a kiosk, or any other type of computing device. Each client device 220 can be implemented using hardware or a combination of software and hardware. Each client device 220 can include a display device that can provide visual information, such as information presented as a result of executing instructions stored in the memory of the client device 220. The display device can include an liquid-crystal display (LCD) device, an organic light-emitting diode (OLED) display, a light-emitting diode (LED) display, a bi-stable display (e.g., e-ink, etc.), amongst others. The display device can present one or more user interfaces on various regions of the display in accordance with the implementations described herein. In some implementations, the display device can include interactive elements, such as a capacitive or resistive touch sensors. Thus, the display device can be an interactive display (e.g., a touchscreen, a display, etc.), and can include one or more input/output (I/O) devices or interfaces. Each client device 220 can further include or be in communication with (e.g., via a communications bus coupled to the processors of the client devices 220, etc.) one or more input devices, such as a mouse, a keyboard, or digital key pad, among others.

The display can be used to present one or more applications as described herein, such as web browsers or native applications. The display can include a border region (e.g., side border, top border, bottom border). The inputs received via the input/output devices (e.g., touchscreen, mouse, keyboard, etc.) can be detected by one or more event listeners, and indicate interactions with one or more user interface elements presented on the display device of the client devices 220. The interactions can result in interaction data, which can be stored and transmitted by the processing circuitry of the client device 220 to other computing devices, such as those in communication with the client devices 220. The interaction data can include, for example, interaction coordinates, an interaction type (e.g., click, swipe, scroll, tap, etc.), and an indication of an actionable object with which the interaction occurred. Thus, each client device 220 can enable a user to interact with and/or select one or more actionable objects presented as part of graphical user interfaces to carry out various functionalities as described herein.

The client devices 220 can each execute one or more client applications, which can include a web browser or native application that presents information resources, which can be presented by one or more publisher computing devices (not pictured). As described herein, the information resources may cause a client device 220 to transmit a request to the media asset server to present one or more of the media assets 270 or the transformed assets 275 stored in the catalog 265. The one or more client applications can cause the display device of one or more client devices 220 to present a user interface that includes the information resource, and one or more of the media assets 270 or transformed assets 275 requested by the client device 220 (e.g., based on a script included in the information resource, etc.). The application can be a web application or web page (e.g., provided by a publisher device via the network 210, etc.), a native application, an operating system resource, or some other form of executable instructions. In some implementations, the client application can include a local application (e.g., local to a client device 220), hosted application, Software as a Service (SaaS) application, virtual application, mobile application, and other forms of content. In some implementations, the web page displayed on the client device can be presented as part of a web page that presents one or more media assets 270, such as a media provider website or website for an electronic store. In some implementations, the web page can cause (e.g., via one or more scripts, markup language, or computer-readable instructions, etc.) the client device 220 to generate a user interface that displays one or more of the media assets 270 or the transformed media assets 275. In some implementations, the user interface can include one or more actionable objects that correspond to links, buttons, or other user-selectable objects that allow the user to navigate the website, web application, or native application. In some implementations, the application can be an email application, and the media assets 270 or the transformed assets 275 can be displayed in one or more emails received from a publisher device.

Each of the client devices 220 can be computing devices configured to communicate via the network 210 to access the information resources, such as web pages via a web browser, emails via an email client, or application resources via a native application executing on a client device 220. When accessing the information resources, the client device 220 can execute instructions (e.g., embedded in the native applications, or a script in the information resources 280, etc.) that cause the client devices to display content, which can include text, images, video, audio, or other types of media assets 270. As described herein, the client device 220 can transmit one or more requests for media assets to the media asset server 260, and can receive one or more responses that include the requested content. A request for a media asset 270 can include, for example, a request for an identified media asset 270 and information about the client device 220 (e.g., device information, user profile information, a user identifier, etc.).

The media asset server 260 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The media asset server 260 can include one or more computing devices or servers that can perform various functions as described herein. In some implementations, the media asset server 260 can be a cloud computing resource, such as the cloud 108 described in connection with FIG. 1B. The media asset server 260 can include any or all of the components and perform any or all of the functions of the computer system 100 described herein in conjunction with FIGS. 1A-1D.

The media asset server 260 can be a server, or group of distributed computing devices, which includes a database 215 that stores a catalog 265 of media assets 270 and transformed media assets 275. The media asset server 260 can transmit one or more media assets 270, or transformed media assets 275, in response to request received from computing devices via the network 210. In some implementations, the requests for content can identify the requested media asset 270 or the requested transformed media asset 275. In some implementations, in response to receiving a request, the media asset server 260 can select a media asset 270 or a transformed media asset 275 based on the content of the request. For example, the media asset server 260 can select a media asset 270 if the request indicates a request for one of the media assets 270. In another example, if the request indicates a request for one of the transformed assets 275, the media asset server 260 can select a transformed asset 275 in response to the request.

In some implementations, the media asset server 260 can select a media asset 270 or a transformed asset 275 based on a similarity between the media asset 270 or the transformed asset 275 and a client device profile of a client device 220 that transmitted the request. In some implementations, the media asset server 260 can select a media asset 270 or a transformed asset 275 based on a target serving context (e.g., client device 220 information, information resource content displayed at the requesting client device 220, client device profile information, etc.). In some implementations, the request for a media asset 270 or a transformed asset 275 can be transmitted by a publisher device (not pictured). In response, the media asset server 260 can transmit the media asset 270 or the transformed asset 275 to the publisher device via the network 210. The publisher device 260 can then incorporate (e.g., include, merge, combine, etc.) the media asset 270 or the transformed asset 275 into one or more information resources of the publisher device, such as a webpage or an email, which can be transmitted to one or more client devices 220. In some implementations, the publisher device can monitor information resources associated with a transformed asset 275 that were previously accessed by a client device 220, and transmit an email including the transformed content 275 (e.g., provided by the media asset server 260), to the client device 220.

The media asset server 260 can include the database 215. The database 215 can be a computer-readable memory that can store or maintain one or more catalog(s) 265. The database 215 can maintain one or more data structures, which may contain, index, or otherwise store information, such as the catalog(s) 265, the media assets 270, and the transformed assets 275. The database 215 can be accessed using one or more memory addresses, index values, or identifiers of any item, structure, or region maintained in the database 215. The database 215 can be accessed by the components of the media processing system 205, or any other computing device described herein, such as the client devices 220 or a publisher device, via the network 210. In some implementations, the database 215 can be internal to the media asset server 260. In some implementations, the database 215 can exist external to the media asset server 260, and may be accessed by the media asset server 260 via the network 210. In some implementations, both the media asset server 260 and the database 215 can be distributed across many different computer systems or storage elements, and may be accessed via the network 210 or a suitable computer bus interface. In some implementations, the database 215 can be similar to or include the storage 128 described herein above in conjunction with FIG. 1C. In some implementations, the database 215 can be a distributed storage medium in a cloud computing system, such as the cloud 108 detailed herein in connection with FIG. 1B.

The database 215 can store one or more catalog(s) 265 in one or more data structures, which can be associated with a respective publisher device. The catalog(s) 265 can be, for example, in an XML or a CSV format, and can include lists of identifiers of media assets 270 and transformed assets 275. For example, a catalog 265 can store media assets 270 and transformed assets 275 that that are associated with a respective publisher device. When a client device accesses information resources of the publisher device, the client device 220 can transmit requests to the media asset server 260 for a media asset 270 or the transformed assets 275 from a catalog 265 that corresponds to the respective publisher device. The catalog 265 can store one or more media assets 270, for example, in one or more data structures. One or more of the media assets 270 or one or more of the transformed media assets 275 can be transmitted to one or more client devices 220 in response to requests, as described herein. In some implementations, the media assets 270 or the transformed media assets 275 can be transmitted to a publisher device, which can include the media assets 270 or the transformed media assets 275 in one or more email messages that can be transmitted to a client device 220. In some implementations, each of the media assets 270 can be stored in association with an identifier of each respective media asset 270. The media assets 270 can be any form of electronic media, including text, images, video, audio, or instructions to display images, video, or text in an information resource (e.g., a web page, an application resource, an email, a short-message service (SMS) message, etc.). The media assets 270 can be stored in association with one or more tags, topics, product identifiers, or category identifiers that indicate the type of information provided by the media asset 270.

The one or more catalog(s) 265 can store one or more transformed assets 275. The transformed assets 275 can be generated by the media processing system 205 as described in detail herein, and can be indexed in one or more files, such as XML files or CSV files. The transformed assets 275 can each correspond to a respective media asset 270. A transformed asset 275 can be a corresponding media asset 270 that is modified to include additional information, such as information retrieved from a remote computing system 280 or an external asset source 285. The transformed assets 275 can be, for example, a flattened version of a corresponding media asset 270 with an overlay of additional content generated based on information retrieved from the remote computing system 280 or the external asset source 285. In some implementations, when a request is received for a media asset 270, the media asset server 260 can transmit the transformed asset 275 that corresponds to the requested media asset 270 based on the contents of the request (e.g., a user profile identifier, etc.). In some implementations, the request can indicate that the transformed version of a media asset 270 is desired, and in response the media asset server 260 can select and transmit the corresponding transformed asset 275 to the requesting computing device.

The remote computing device 280 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The remote computing device 280 can include one or more computing devices or servers that can perform various functions as described herein. In some implementations, the remote computing device 280 can be a cloud computing resource, such as the cloud 108 described in connection with FIG. 1B. The remote computing device 280 can include any or all of the components and perform any or all of the functions of the computer system 100 described herein in conjunction with FIGS. 1A-1D.

The remote computing system 280 can be a server, or group of distributed computing devices, which can provide additional information to the media processing system 205 in response to one or more requests. The additional information can be used, for example, to generate one or more transformed assets 275 that can be stored in the catalog 265. The additional information can include, for example, any type of data related to a media asset 270, including a description of the media asset, a title of the media asset, payment information associated with the media asset (e.g., payment installment information, interest rate information, price information, etc.), category information related to the media asset, user-specific information that corresponds to the media asset (e.g., information from one or more user profiles used to access the respective publisher, etc.), or any other media asset data or metadata. A request for additional information can include an identifier of a particular media asset. In some implementations, the request can indicate a type of additional information, or selection criteria for the additional information, that the remote computing system can use to select additional information to provide in response to the request. For example, the request for additional information can indicate a corresponding client device identifier or user profile identifier, which can be used to select additional information that is associated with both the user profile identifier and the media asset(s) 270 identified in the request. In some implementations, the request can indicate a category or topic, and the remote computing system 260 can select additional information associated with both the category or topic and the identified media asset(s) 270. The additional information can be transmitted to the media processing system 205 to generate one or more transformed assets 275.

The external asset source 285 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The external asset source 285 can include one or more computing devices or servers that can perform various functions as described herein. In some implementations, the external asset source 285 can be a cloud computing resource, such as the cloud 108 described in connection with FIG. 1B. The external asset source 285 can include any or all of the components and perform any or all of the functions of the computer system 100 described herein in conjunction with FIGS. 1A-1D.

The external asset source 285 can be a server, or group of distributed computing devices, different from the media asset server 260, which provides the media assets 270. For example, in some implementations, the media processing server 205 can generate one or more catalogs 265 using media assets 270 retrieved (e.g., using one or more scraping procedures, etc.) from the external asset source 285. The external asset source 285 may store media assets 270 in a format that is different from the format used to store the catalog 265 at the media asset server 260. In some implementations, the media processing system 205 can store the media assets 270 in a catalog 265 generated by the media processing system 205. In addition, the external asset source 285 can include additional information about media assets 270 hosted by the external asset source 285, including metadata or other information related to media assets 270 as described herein.

Referring now to the operations of the media processing system 205, the request identifier 230 can identify a request to update one or more media assets 270 maintained in a database 215 of the media asset server 260. For example, the request can be a request transmitted by a publisher device (not pictured) that provides one or more information resources that include the media assets 270 to one or more client devices 220. In some implementations, the request can be a request to update the media assets 270 at the media asset server 270 on a periodic basis. For example, the request can indicate one or more catalogs 265 of media assets 270, or one or more specific media assets 270, or one or more regions of memory at the media asset server 260 (e.g., a folder or directory, etc.), to update or modify with additional data. In some implementations, the request can be a request to update one or more of the media assets 270 periodically or on a predetermined schedule. In some implementations, the request can be a request to update the media assets 270 as the catalog 265 is updated (e.g., by another computing device via the network 210, etc.).

In such implementations, the request identifier 230 can detect an update to the database 215 or the catalog 265 of the media asset server 260 by using one or more API calls. For example, when the media asset server 260 detects an update to the database 215 or one or more catalogs 265, the media asset server 260 can transmit a message indicating which portions of the database 215 or the catalogs 265 were updated (e.g., a list of identifiers of updated media assets 270) using a corresponding API of the media processing system 205. In some implementations, the request identifier 230 can periodically (e.g., hourly, daily, any other period of time, etc.), query the media asset server 260, using an API call corresponding to the media asset server 260, with a request for information regarding whether the database 215 or a specific catalog 265 has been updated. If there has been an update, the request identifier 230 can transmit a request for any added or changed media assets 270 for use in the processes described herein. In some implementations, the request identifier 230 can query the remote computing system 280 using an API call corresponding to the remote computing system 280 to request whether the additional data corresponding to any of the media assets 270 have been updated. In response, the request identifier 230 can receive an indication that one or more portions of the additional data associated with any of the media assets 270 has changed. Upon receiving the indication, the request identifier 230 can retrieve the updated additional data from the remote computing system 280, and retrieve the corresponding media assets 270 from the media asset server 260 to generate the transformed assets 275 as described herein.

The data retriever 235 can retrieve, from the database 215 of the media asset server 260, the one or more media assets 270 (e.g., which are identified as media assets 270 to be modified in the request) and object metadata associated with each of the media assets 270. The object metadata of a media asset 270 can be any sort of information related to the media asset 270, including descriptive information, title information, presentation information, payment information, product information, information that describes objects depicted in or described in a media asset 270, or any other information relating to a media asset 270. The object metadata can be, for example, included in the catalog 265 maintained in the database 215 by the media asset server 260. In some implementations, the data retriever 235 can retrieve a portion of, or all of, the catalog 265 corresponding to a publisher identified in the request. Then, the data retriever 235 can extract the object metadata from the catalog 265, which in some implementations can include a list of identifiers of the media assets 270 to be updated.

Using the identifiers of the media assets 270, the data retriever 235 can retrieve the media assets 270 from the media asset server 260 by transmitting one or more requests for the media assets 270 to the media server 260 via the network 210. In response, the media asset server 260 can transmit the requested media assets 270 to the data retriever 235, which can store each media asset in one or more data structures in the memory of the media processing system 205 in association with the object metadata corresponding to each media asset. In some implementations, the data retriever 235 can retrieve one or more of the media assets 270, the object metadata, or the additional information from the external asset source 285. In some implementations, to reduce overall memory consumption, the media processing system 205 can process the media assets 270 in bursts (e.g., retrieve a subset of the media assets 270, process the media assets into transformed assets 275, and write the transformed assets 275 to the catalog 265, retrieve a next subset of media assets 270, and so on). In some implementations, the object metadata can include information that is displayed on an information resource in connection with a media asset (e.g., a description or corresponding block of text displayed in association with the media asset 270, etc.).

In some implementations, the data retriever 235 can generate the one or more media assets 270 and the object metadata of each of the one or more media assets 270 by scraping the database 215 of the media asset server 260 or a web page provided by a remote computing device. For example, in some cases, a catalog 265 including identifiers of the media assets 270 may not exist. Therefore, in order to retrieve each of the media assets 270 and the object metadata relating to the media assets, the data retriever 235 can scrape, or iterate through each file hosted by the media server 260 or the external asset source 285, to identify and retrieve the media assets 270. In some implementations, the external asset source 285 can host one or more websites or webpages (e.g., HTML documents, scripts, etc.). The data retriever 235 can scrape the website or webpages of the external asset source by parsing any media files, HTML documents, or scripts hosted or maintained by the external asset source 285. When scraping the said files, the data retriever 235 can identify one or more media assets 270 that have attributes that match those of the media assets 270 identified in the request (e.g., part of a subdomain or region of memory, by filename, by date, or by another filtering criteria, etc.). Likewise, the data retriever 235 can scrape the external asset source 285 or the database 215 to identify object metadata associated with each media asset 270.

The data retriever 235 can retrieve, from the remote computing system 280, additional data corresponding to the object metadata of each media asset 270 to be updated by the media processing system 205. The data retriever 235 can provide the object metadata of each media asset to the remote computing system 280, such that the remote computing system 280 can use the object metadata to retrieve additional data that is specific to the respective media asset 270. In some implementations, the remote computing system 280 can be identified in the request to update the one or more media assets. In some implementations, the data retriever 235 can retrieve the additional data from the remote computing system 280 in response to determining that the additional data for one or more media assets 270 has been updated. In some implementations, the additional data for each media asset 270 can be retrieved based on specified criteria. For example, in some implementations, the data retriever 235 can retrieve sets of additional data for each media asset, where each item of data in a set of additional data corresponds to a category, topic, or media asset selection criteria.

For example, a set of additional data may be retrieved for modification of a media asset 270 for a target group of client devices 220, and may include information relating to specified attributes (e.g., specified in the request identified by the request identifier 230) of one or more client devices 220. Each set of retrieved data can be stored in association with the specified criteria used to retrieve the additional data. As described herein, the additional data is used by the media processing system 205 to modify one or more media assets 270 to generate one or more corresponding transformed assets 275. The additional data for a media asset 270 can include, for example, any type of data related to a media asset 270, including a description of the media asset, a title of the media asset, payment information associated with the media asset (e.g., payment installment information, interest rate information, price information, etc.), category information related to the media asset, user-specific information that corresponds to the media asset (e.g., information from one or more user profiles used to access the respective publisher, etc.), or any other media asset data or metadata. In some implementations, the additional data can include information about the remote computing system 280 from which the additional data was retrieved. For example, in some implementations, to access or display the additional information, the remote computing system 280, or other rules or regulations, may require predetermined text or additional information be displayed in connection with a media asset 270 modified to include the additional data (e.g., a transformed asset 275).

Once the additional data has been retrieved for each media asset 270, the media asset generator 240 can generate, for each retrieved media asset 270, a transformed asset 275 (e.g., an updated media asset 270), to include the additional data associated with the media asset 270. Generating a transformed asset 275 using a media asset 270 can include modifying a media asset 270 to include the additional data retrieved for that media asset 270 by overlaying the additional data onto the media asset 270. For example, if the media asset 270 is an image, video, or other type of media asset that can be rendered, the media asset generator 240 can generate overlay content including at least a portion of the additional data, which can be combined with the media asset 270 to generate the transformed asset 275. Generating the overlay content can include selecting a theme (e.g., one or more graphical elements, graphic colors, etc.) for the overlay content.

In some implementations, the theme, or type of overlay content, can be specified in the request to modify the one or more media assets 270. In some implementations, the media asset generator 240 can select a default overlay format (e.g., colors, position, etc.). Likewise, in some implementations, the media asset generator 240 parse one or more colors of the media assets 270 to identify an overlay format (e.g., colors, shape, location in the media asset 270, etc.). In some implementations, the overlay format or colors may be specified by the remote computing system 280 from which the additional data was retrieved. The overlay content can be, for example, an overlay template that is generated to conform to the size and shape of the corresponding media asset 270. The overlay content template can be populated with portions of the additional data for the media asset 270, and the media asset 270 can be modified such that the overlay content is overlaid on top of the media asset 270. If the media asset 270 is an image, the overlay content can be placed over the media content 270 as a top layer, and the combined image can be flattened to generate the transformed content 275 for that media asset 270. Similar processes can be performed for media assets 270 that include video content. For example, the media asset generator 270 can select one or more frames of the media asset 270 to overlay with the overlay content. The video can then be flattened to generate to the transformed content 275. An example modified media asset 270 that is an image is depicted in FIG. 3.

Figure 3:
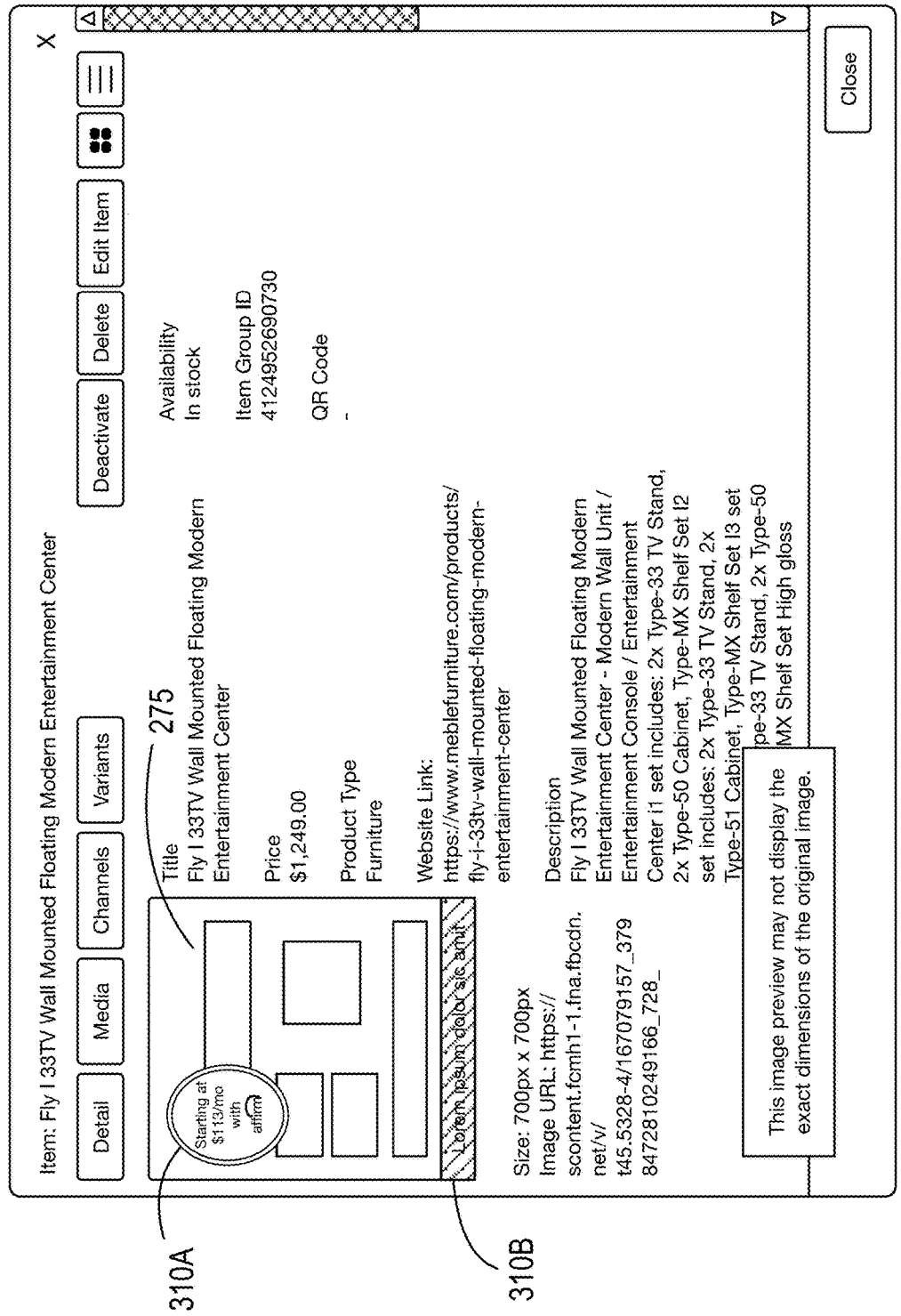
FIG. 3 depicts an image of an example modified media asset displayed in association with corresponding metadata, in accordance with one or more implementations.

Referring briefly now to FIG. 3, depicted is a screenshot image 300 of an example transformed asset 275 displayed in association with corresponding object metadata, in accordance with one or more implementations. As shown, the transformed asset 275 is a media asset 270 combined with overlay content 310A and 310B. The overlay content 310B is a small banner that is predetermined height and having a width that matches the width of the media asset 270. The overlay content 310B is a bordered circle, which is partially transparent, that includes a second portion of the additional data. In this example, the additional data is payment information relating to a wall-mounted entertainment center product. The media asset is a picture of the product, and the object metadata includes attributes of the product displayed adjacent to the image (e.g., the title, price, product type, website link, description, group identifier, etc.). In addition, the size of the image (700 px by 700 px) is displayed.

Referring back now to FIG. 2 and the operations of the media processing system 205, the media asset generator 240 can modify other types of content, in addition to images and video, to generate corresponding transformed assets 275. For example, the media asset generator 240 can modify or otherwise alter audio content to include additional information. Modifying audio content can include, for example, splicing in audio segments that correspond to the additional data retrieved for the corresponding media asset 270. The audio segments can be spliced into, or otherwise incorporated with the audio content of media asset at predetermined intervals, or at intervals specified in the object metadata associated with the media asset 270. If multiple sets of additional data are retrieved for a media asset 270, the media asset generator 240 can generate a transformed asset 275 as described herein for each item of additional data in the set of additional data retrieved for the media asset 270. Each of the transformed assets 275 generated for a media asset 270 can be stored in association with the media asset 270 from which the transformed assets 275 were generated.

The object metadata modifier 245 can modify the object metadata of each of the one or more media assets 270 based on the additional data retrieved for the one or more media assets from the remote computing system 280. As described herein, the object metadata for a media asset 270 can include, for example, descriptive information, title information, presentation information, payment information, product information, information that describes objects depicted in or identified by a media asset 270, or any other information relating to a media asset 270. In some implementations, the object metadata for a media asset 270 can include one or more tags (e.g., category information, other targeting information) that are used by a content provider system (not pictured) to select the media asset 270 for presentation on a client device 220. To reflect the changes made to the media asset 270 when the transformed asset 275 is generated for the media asset 270, the object metadata modifier 245 can modify the object metadata for the corresponding transformed asset 275 to include at least a portion of the additional data.

The portions of the additional data to be included in the object metadata can be specified by information in the catalog 265 of the media asset 270, information retrieved from the remote computing system 280, or information specified by the publisher device (not pictured) that made the request to update the catalog 265 or the media assets 270. In some implementations, the object metadata modifier 245 can modify the object metadata by modifying a description of the transformed asset 275 to include at least a portion of the additional data, such as a predetermined text string specified by the remote computing system 280. In some implementations, the object metadata modifier 245 can modify the object metadata for each transformed asset 275 generated for a media asset 270. The object metadata can be modified to identify that the transformed asset 275 with which it is associated is a modified form of a particular media asset 270.

Once the transformed assets 275 are generated and the object metadata has been modified for each transformed asset 275, the database updater 250 can update the database 215 with each transformed asset 275. To do so, the database updater 250 can formatting the object metadata of the transformed assets 275 to conform to formatting requirements of the media asset server 260. For example, once the transformed assets 275 and the corresponding object metadata are generated or modified, the database updater 250 can format the transformed assets 275 and the object metadata into the format of the catalog 265. This can include, for example, generating appropriate XML data or CSV data in accordance with the requirements of the media asset server 260. In some implementations, the database updater 250 can format the transformed assets 275 and the object metadata using a formatting API that corresponds to the media asset server 260 or to the catalog 265 format. Once the transformed assets 275 and the object metadata have been formatted, the database updater 250 can update the database 215 and/or the catalog 265 by transmitting the formatted transformed assets 275 and the modified object metadata for each transformed asset 275 to the media asset server 260. For example, the database updater 250 can utilize an API corresponding to the database 215 or the media asset server 260 to push the transformed assets 275 and the object metadata to the media asset server 260. In some implementations, the database updater 250 can update the database 215 or the catalog 265 in response to the request to update the media assets 270. In some implementations, the database updater 265 can transmit the transformed formatted transformed assets 275 and the object metadata to a different asset server (not pictured).

Once the media asset server is updated, the transformed assets 275 and any associated object metadata can be transmitted to the client devices 220 in accordance with one or more requests, as described herein. For example, various publishers may select and serve one or more transformed assets 275 to corresponding client devices 220, for example, when the client devices 220 are associated with content selection information that corresponds to (e.g., is similar to, or identifies, etc.) the modified object metadata of the one or more transformed asset 275. In some cases, publishers can select one or more transformed assets 275 for provision to client devices 220 such that the one or more transformed assets 275 and any appropriate object metadata are displayed in one or more information resources, which can include webpages or emails transmitted to the client devices 220.

Figure 4:
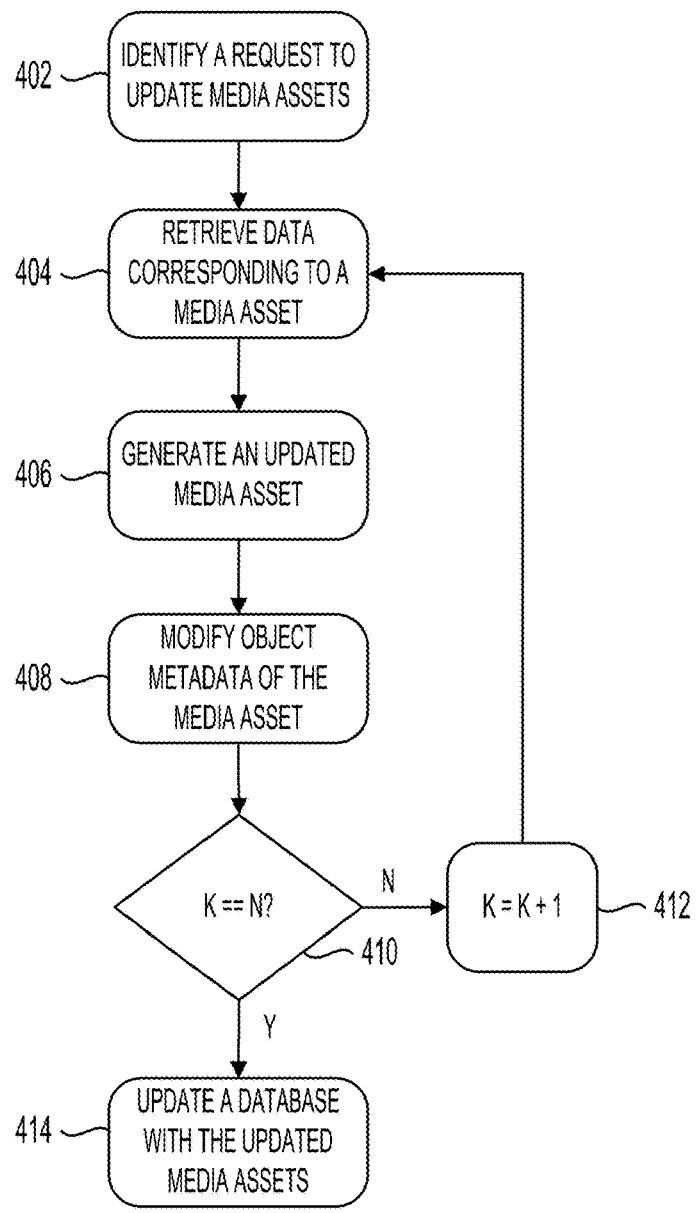
FIG. 4 illustrates an example flow diagram of a method of transforming content using data retrieved from external sources, in accordance with one or more implementations.

Referring now to FIG. 4, depicted is an illustrative flow diagram of a method 400 of transforming content using data retrieved from external sources. The method 400 can be executed, performed, or otherwise carried out by the media processing system 205, the computer system 100 described herein in conjunction with FIGS. 1A-1D, or any other computing devices described herein. In brief overview of the method 400, the media processing system (e.g., the media processing system 205, etc.) can identify a request to update media assets (e.g., the media assets 270, etc.) (STEP 402), retrieve data corresponding to a media asset (STEP 404), generate an updated media asset (e.g., a transformed asset 275) (STEP 406), modify object metadata of the media asset (STEP 408), determine whether the counter register k is equal to the number of media assets n (STEP 410), increment the counter register k (STEP 412), and update a database (e.g., the database 215, etc.) with the updated media assets (STEP 414).

In further detail of the method 400, the media processing system can identify a request to update media assets (e.g., the media assets 270, etc.) (STEP 402). For example, the request can be a request transmitted by a publisher device that provides one or more information resources that include the media assets to one or more client devices (e.g., the client devices 220, etc.). In some implementations, the request can be a request to update the media assets at a media asset server (e.g., the media asset server 260, etc.) on a periodic basis. For example, the request can indicate one or more catalogs (e.g., the catalog(s) 265, etc.) of media assets, or one or more specific media assets, or one or more regions of memory at the media asset server (e.g., a folder or directory, etc.), to update or modify with additional data. In some implementations, the request can be a request to update one or more of the media assets periodically or on a predetermined schedule. In some implementations, the request can be a request to update the media assets as the catalog is updated (e.g., by another computing device via the network 210, etc.).

In such implementations, the media processing system can detect an update to the database or the catalog of the media asset server by using one or more API calls. For example, when the media asset server detects an update to the database or one or more catalogs, the media asset server can transmit a message indicating which portions of the database or the catalogs were updated (e.g., a list of identifiers of updated media assets) using a corresponding API of the media processing system. In some implementations, the media processing system can periodically (e.g., hourly, daily, any other period of time, etc.) query the media asset server, using an API call corresponding to the media asset server, with a request for information regarding whether the database or a specific catalog has been updated. If there has been an update, the media processing system can transmit a request for any added or changed media assets for use in the processes described herein. In some implementations, the media processing system can query a remote computing system (e.g., the remote computing system 280, etc.) using an API call corresponding to the remote computing system to request whether the additional data corresponding to any of the media assets have been updated. In response, the media processing system can receive an indication that one or more portions of the additional data associated with any of the media assets has changed. Upon receiving the indication, the media processing system can retrieve the updated additional data from the remote computing system, and retrieve the corresponding media assets from the media asset server to generate the transformed assets as described herein.

The media processing system can retrieve additional data corresponding to a media asset (STEP 404). In addition, the media processing system can retrieve, from the database of the media asset server, the one or more media assets (e.g., which are identified as media assets to be modified in the request) and object metadata associated with each of the media assets. The object metadata of a media asset can be any sort of information related to the media asset, including descriptive information, title information, presentation information, payment information, product information, information that describes objects depicted in or described in a media asset, or any other information relating to a media asset. The object metadata can be, for example, included in the catalog maintained in the database by the media asset server. In some implementations, the media processing system can retrieve a portion of, or all of, the catalog corresponding to a publisher identified in the request. Then, the media processing system can extract the object metadata from the catalog, which in some implementations can include a list of identifiers of the media assets to be updated.

Using the identifiers of the media assets, the media processing system can retrieve the media assets from the media asset server by transmitting one or more requests for the media assets to the media server via a network (e.g., the network 210, etc.). In response, the media asset server can transmit the requested media assets to the media processing system, which can store each media asset in one or more data structures in the memory of the media processing system in association with the object metadata corresponding to each media asset. In some implementations, the media processing system can retrieve one or more of the media assets, the object metadata, or the additional information from an external asset source (e.g., the external asset source 285, etc.). In some implementations, to reduce overall memory consumption, the media processing system can process the media assets in bursts (e.g., retrieve a subset of the media assets, process the media assets into transformed assets, and write the transformed assets to the catalog, retrieve a next subset of media assets, and so on). In some implementations, the object metadata can include information that is displayed on an information resource in connection with a media asset (e.g., a description or corresponding block of text displayed in association with the media asset, etc.).

In some implementations, the media processing system can generate the one or more media assets and the object metadata of each of the one or more media assets by scraping the database of the media asset server or a web page provided by a remote computing device. For example, in some cases, a catalog including identifiers of the media assets may not exist. Therefore, in order to retrieve each of the media assets and the object metadata relating to the media assets, the media processing system can scrape, or iterate through each file hosted by the media server or the external asset source, to identify and retrieve the media assets. In some implementations, the external asset source can host one or more websites or webpages (e.g., HTML documents, scripts, etc.). The media processing system can scrape the website or webpages of the external asset source by parsing any media files, HTML documents, or scripts hosted or maintained by the external asset source. When scraping the said files, the media processing system can identify one or more media assets that have attributes that match those of the media assets identified in the request (e.g., part of a subdomain or region of memory, by filename, by date, or by another filtering criteria, etc.). Likewise, the media processing system can scrape the external asset source or the database to identify object metadata associated with each media asset.

The media processing system can retrieve, from the remote computing system, additional data corresponding to the object metadata of each media asset to be updated by the media processing system. The media processing system can provide the object metadata of each media asset to the remote computing system, such that the remote computing system can use the object metadata to retrieve additional data that is specific to the respective media asset. In some implementations, the remote computing system can be identified in the request to update the one or more media assets. In some implementations, the media processing system can retrieve the additional data from the remote computing system in response to determining that the additional data for one or more media assets has been updated. In some implementations, the additional data for each media asset can be retrieved based on specified criteria. For example, in some implementations, the media processing system can retrieve sets of additional data for each media asset, where each item of data in a set of additional data corresponds to a category, topic, or media asset selection criteria.

For example, a set of additional data may be retrieved for modification of a media asset for a target group of client devices, and may include information relating to specified attributes (e.g., specified in the request identified by the media processing system) of one or more client devices. Each set of retrieved data can be stored in association with the specified criteria used to retrieve the additional data. As described herein, the additional data is used by the media processing system to modify one or more media assets to generate one or more corresponding transformed assets. The additional data for a media asset can include, for example, any type of data related to a media asset, including a description of the media asset, a title of the media asset, payment information associated with the media asset (e.g., payment installment information, interest rate information, price information, etc.), category information related to the media asset, user-specific information that corresponds to the media asset (e.g., information from one or more user profiles used to access the respective publisher, etc.), or any other media asset data or metadata. In some implementations, the additional data can include information about the remote computing system from which the additional data was retrieved. For example, in some implementations, to access or display the additional information, the remote computing system, or other rules or regulations, may require predetermined text or additional information be displayed in connection with a media asset modified to include the additional data (e.g., a transformed asset).

The media processing system can generate an updated media asset (e.g., a transformed asset) (STEP 406). Generating a transformed asset using a media asset can include modifying a media asset to include the additional data retrieved for that media asset by overlaying the additional data onto the media asset. For example, if the media asset is an image, video, or other type of media asset that can be rendered, the media processing system can generate overlay content including at least a portion of the additional data, which can be combined with the media asset to generate the transformed asset. Generating the overlay content can include selecting a theme (e.g., one or more graphical elements, graphic colors, etc.) for the overlay content.

In some implementations, the theme, or type of overlay content, can be specified in the request to modify the one or more media assets. In some implementations, the media processing system can select a default overlay format (e.g., colors, position, etc.). Likewise, in some implementations, the media processing system parse one or more colors of the media assets to identify an overlay format (e.g., colors, shape, location in the media asset, etc.). In some implementations, the overlay format or colors may be specified by the remote computing system 280 from which the additional data was retrieved. The overlay content can be, for example, an overlay template that is generated to conform to the size and shape of the corresponding media asset. The overlay content template can be populated with portions of the additional data for the media asset, and the media asset can be modified such that the overlay content is overlaid on top of the media asset. If the media asset is an image, the overlay content can be placed over the media content as a top layer, and the combined image can be flattened to generate the transformed content for that media asset. Similar processes can be performed for media assets that include video content. For example, the media processing system can select one or more frames of the media asset to overlay with the overlay content. The video can then be flattened to generate to the transformed content.

The media processing system can modify other types of content, in addition to images and video, to generate corresponding transformed assets. For example, the media processing system can modify or otherwise alter audio content to include additional information. Modifying audio content can include, for example, splicing in audio segments that correspond to the additional data retrieved for the corresponding media asset. The audio segments can be spliced into, or otherwise incorporated with the audio content of media asset at predetermined intervals, or at intervals specified in the object metadata associated with the media asset. If multiple sets of additional data are retrieved for a media asset, the media processing system can generate a transformed asset as described herein for each item of additional data in the set of additional data retrieved for the media asset. Each of the transformed assets generated for a media asset can be stored in association with the media asset from which the transformed assets were generated.

The media processing system can modify object metadata of the media asset (STEP 408). The media processing system can modify the object metadata of each of the one or more media assets based on the additional data retrieved for the one or more media assets from the remote computing system. As described herein, the object metadata for a media asset can include, for example, descriptive information, title information, presentation information, payment information, product information, information that describes objects depicted in or identified by a media asset, or any other information relating to a media asset. In some implementations, the object metadata for a media asset can include one or more tags (e.g., category information, other targeting information) that are used by a content provider system (not pictured) to select the media asset for presentation on a client device. To reflect the changes made to the media asset when the transformed asset is generated for the media asset, the media processing system can modify the object metadata for the corresponding transformed asset to include at least a portion of the additional data.

The portions of the additional data to be included in the object metadata can be specified by information in the catalog of the media asset, information retrieved from the remote computing system, or information specified by the publisher device (not pictured) that made the request to update the catalog or the media assets. In some implementations, the media processing system can modify the object metadata by modifying a description of the transformed asset to include at least a portion of the additional data, such as a predetermined text string specified by the remote computing system. In some implementations, the media processing system can modify the object metadata for each transformed asset generated for a media asset. The object metadata can be modified to identify that the transformed asset with which it is associated is a modified form of a particular media asset.

The media processing system can determine whether the counter register k is equal to the number of media assets n (STEP 410). To determine whether each media asset has been used to generate at least one corresponding transformed asset, the media processing system can compare the counter register k, which is used to track the number of processed media assets, to the total number of media assets to be processed n. If the counter register k is not equal to (e.g., less than) the total number of media assets to be processed n, the media processing system can execute (STEP 412). If the counter register k is equal to (e.g., equal to or greater than) the total number of media assets to be processed n, the media processing system can execute (STEP 414).

The media processing system can increment the counter register k (STEP 412). To track the total number of media assets that have been processed into transformed assets, the media processing system can add one to the counter register k to indicate the number of media assets that have been processed has increased by one. After incrementing the value of the counter register k, the media processing system can execute (STEP 404).

The media processing system can update a database with the updated media assets (STEP 414). To do so, the media processing system can formatting the object metadata of the transformed assets to conform to formatting requirements of the media asset server. For example, once the transformed assets and the corresponding object metadata are generated or modified, the media processing system can format the transformed assets and the object metadata into the format of the catalog. This can include, for example, generating appropriate XML data or CSV data in accordance with the requirements of the media asset server. In some implementations, the media processing system can format the transformed assets and the object metadata using a formatting API that corresponds to the media asset server or to the catalog format. Once the transformed assets and the object metadata have been formatted, the media processing system can update the database and/or the catalog by transmitting the formatted transformed assets and the modified object metadata for each transformed asset to the media asset server. For example, the media processing system can utilize an API corresponding to the database or the media asset server to push the transformed assets and the object metadata to the media asset server. In some implementations, the media processing system can update the database or the catalog in response to the request to update the media assets 270.

Once the media asset server is updated, the transformed assets and any associated object metadata can be transmitted to the client devices in accordance with one or more requests, as described herein. For example, various publishers may select and serve one or more transformed assets to corresponding client devices, for example, when the client devices are associated with content selection information that corresponds to (e.g., is similar to, or identifies, etc.) the modified object metadata of the one or more transformed asset. In some cases, publishers can select one or more transformed assets for provision to client devices such that the one or more transformed assets and any appropriate object metadata are displayed in one or more information resources, which can include webpages or emails transmitted to the client devices.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the media processing system 205 can include clients and servers. For example, the media processing system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the media processing system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for transforming content using data retrieved from external sources, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method, comprising:
    identifying, by one or more processors coupled to memory, a request to update one or more media assets maintained in a database of a media asset system, wherein each media asset comprises one or more images or videos;
    retrieving, by the one or more processors, from a remote data system identified in the request, data corresponding to object metadata of each media asset of the one or more media assets, wherein the data comprises at least one of descriptive information, payment information, category information, user-specific information, or predetermined text strings associated with the target serving context;
    generating, by the one or more processors, for each media asset of the one or more media assets, a transformed media asset by modifying visual portions of the media asset to include the corresponding data retrieved from the remote data system;
    modifying, by the one or more processors, the object metadata of each of the one or more transformed media assets based on the corresponding data retrieved from the remote data system; and
    updating, by the one or more processors responsive to the request, the database with each transformed media asset and corresponding modified object metadata.

2. The method of claim 1, wherein generating the transformed media asset for each media asset of the one or more media assets further comprises:
    generating, by the one or more processors, overlay content including at least a portion of the data; and
    combining, by the one or more processors, the overlay content and the media asset to generate the transformed media asset.

3. The method of claim 2, wherein at least one media asset of the one or more media assets is an image; and
    wherein combining the overlay content and the at least one media asset comprises overlaying, by the one or more processors, the image of the at least one media asset with the overlay content to generate the transformed media asset.

4. The method of claim 1, wherein updating the database further comprises formatting, by the one or more processors, the object metadata of the one or more media assets to conform to formatting requirements of the media asset system.

5. The method of claim 1, further comprising retrieving, by the one or more processors from the database of the media asset system, the one or more media assets and the object metadata of each of the one or more media assets.

6. The method of claim 1, wherein retrieving data corresponding to object metadata of each media asset of the one or more media assets maintained in the database of the media asset system further comprises:
    retrieving, by the one or more processors, a media catalog from the database maintained by the media asset system; and
    extracting, by the one or more processors, from the media catalog, the one or more media assets and the object metadata of each media asset of the one or more media assets.

7. The method of claim 1, wherein identifying the request to update the one or more media assets comprises detecting, by the one or more processors, an update to the database of the media asset system; and
    wherein updating the database with each transformed media asset is responsive to detecting the update.

8. The method of claim 1, wherein identifying the request to update the one or more media assets comprises receiving, by the one or more processors from the remote data system, an indication that the data has changed; and
    wherein updating the database with each transformed media asset is responsive to receiving the indication that the data has changed.

9. The method of claim 1, wherein the object metadata of each media asset of the one or more media assets comprises a description of the media asset, and wherein generating the transformed media asset further comprises modifying the description to include at least a portion of the data.

10. The method of claim 1, further comprising generating, by the one or more processors, the one or more media assets and the object metadata of each of the one or more media assets by scraping, by the one or more processors, the database of the media asset system or a web page provided by a remote computing device.

11. A system, comprising:
    one or more processors coupled to memory, the one or more processors configured to:
        identify a request to update one or more media assets maintained in a database of a media asset system, wherein each media asset comprises one or more images or videos;
        retrieve, from a remote data system identified in the request, data corresponding to object metadata of each media asset of the one or more media assets, wherein the data comprises at least one of descriptive information, payment information, category information, user-specific information, or predetermined text strings associated with the target serving context;
        generate, for each media asset of the one or more media assets, a transformed media asset by modifying visual portions of the media asset to include the corresponding data retrieved from the remote data system;
        modify the object metadata of each of the one or more media assets based on the data; and
        update, responsive to the request, the database with each transformed media asset and corresponding modified object metadata.

12. The system of claim 11, wherein the one or more processors are further configured to generate the transformed media asset for each media asset of the one or more media assets by performing operations comprising:

generating overlay content including at least a portion of the data; and combining the overlay content and the media asset to generate the transformed media asset.

13. The system of claim 12, wherein at least one media asset of the one or more media assets is an image; and wherein the one or more processors are further configured to combine the overlay content and the at least one media asset by overlaying the image of the at least one media asset with the overlay content to generate the transformed media asset.

14. The system of claim 11, wherein the one or more processors are further configured to update the database further by performing operations comprising formatting the object metadata of the one or more media assets to conform to formatting requirements of the media asset system.

15. The system of claim 11, wherein the one or more processors are further configured to retrieve, from the database of the media asset system, the one or more media assets and the object metadata of each of the one or more media assets.

16. The system of claim 11, wherein the one or more processors are further configured to retrieve data corresponding to object metadata of each media asset of the one or more media assets maintained in the database of the media asset system by performing operations comprising:

retrieving a media catalog from the database maintained by the media asset system; and extracting, from the media catalog, the one or more media assets and the object metadata of each media asset of the one or more media assets.

17. The system of claim 11, wherein the one or more processors are further configured to identify the request to update the one or more media assets by performing operations comprising detecting an update to the database of the media asset system; and wherein the one or more processors are further configured to update the database with each transformed media asset responsive to detecting the update.

18. The system of claim 11, wherein the one or more processors are further configured to identify the request to update the one or more media assets by performing operations comprising receiving, from the remote data system, an indication that the data has changed; and wherein the one or more processors are further configured to update the database with each transformed media asset responsive to receiving the indication that the data has changed.

19. The system of claim 11, wherein the object metadata of each media asset of the one or more media assets comprises a description of the media asset, and wherein the one or more processors are further configured to generate the transformed media asset by modifying the description to include at least a portion of the data.

20. The system of claim 11, wherein the one or more processors are further configured to generate the one or more media assets and the object metadata of each of the one or more media assets by scraping the database of the media asset system or a web page provided by a remote computing device.

* * * * *